US012142886B2

(12) United States Patent
Korsmeier et al.

(10) Patent No.: US 12,142,886 B2
(45) Date of Patent: Nov. 12, 2024

(54) MAGAZINE FOR PROCESSING WIRE END FERRULES

(71) Applicant: Phoenix Contact GmbH & Co. KG, Blomberg (DE)

(72) Inventors: Jonas Korsmeier, Bad Lemgo (DE); Jens Frischemeier, Köterberg-Niese (DE); Kilian Klages, Detmold (DE); Danny Siriboe, Hannover (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 237 days.

(21) Appl. No.: 17/436,670

(22) PCT Filed: Mar. 2, 2020

(86) PCT No.: PCT/EP2020/055447

§ 371 (c)(1),
(2) Date: Sep. 7, 2021

(87) PCT Pub. No.: WO2020/178241

PCT Pub. Date: Sep. 10, 2020

(65) Prior Publication Data

US 2022/0140558 A1 May 5, 2022

(30) Foreign Application Priority Data

Mar. 5, 2019 (BE) .................................. 2019/5131

(51) Int. Cl.

| | |
|---|---|
| ***H01R 43/042*** | (2006.01) |
| ***H01R 43/045*** | (2006.01) |
| *B25B 27/14* | (2006.01) |

(52) U.S. Cl.

CPC ....... *H01R 43/0421* (2013.01); *H01R 43/045* (2013.01); *B25B 27/146* (2013.01);
(Continued)

(58) Field of Classification Search

CPC ............. H01R 43/0421; H01R 43/045; Y10T 29/53226; Y10T 29/53235; Y10T 29/53257; B25B 27/146
See application file for complete search history.

(56) References Cited

U.S. PATENT DOCUMENTS 3,911,712 A * 10/1975 Wustinger ......... H01R 43/0421 29/751
4,449,283 A 5/1984 Berecz et al.
(Continued)

FOREIGN PATENT DOCUMENTS

DE 4241224 C1 1/1994
DE 4322856 C1 6/1994
(Continued)

OTHER PUBLICATIONS

Ogihara et al., "Mechanical Analysis of the Crimping Connection," Electrical Contacts—2006. Proceedings of the 52nd IEEE Holm Conference on Electrical Contacts, Montreal, QC, Canada, 2006, pp. 89-94. (Year: 2006).*

*Primary Examiner* — A. Dexter Tugbang
(74) *Attorney, Agent, or Firm* — Calderon Safran & Wright P.C.; David S. Safran

(57) ABSTRACT

A magazine for processing wire end ferrules, which are connected to one another via connection pieces to form a wire end ferrule strip, having a housing with at least one housing base and an inlet opening for introducing the wire end ferrule strip. A transport wheel is rotatably mounted in the housing and has multiple recesses for receiving individual wire end ferrules of a wire end ferrule strip, neighboring recesses separated from one another by a rim. An opening is formed in the housing base and the wire end ferrules can be successively brought into an assembly position via a rotation of the transport wheel to a position in which a wire end ferrule is arranged above the opening and
(Continued)

a connection piece between the wire end ferrule and the neighboring wire end ferrule is at least partially cut through by the rim of the corresponding recess.

10 Claims, 9 Drawing Sheets

(52) U.S. Cl.
CPC .... *Y10T 29/53226* (2015.01); *Y10T 29/53235* (2015.01); *Y10T 29/53257* (2015.01)

(56) References Cited

U.S. PATENT DOCUMENTS

| | | | | |
|---|---|---|---|---|
| 5,347,705 | A | 9/1994 | Schmode et al. | |
| 5,400,941 | A | 3/1995 | Schmode et al. | |
| 5,500,998 | A * | 3/1996 | Schmode | H01R 43/0421 29/566.4 |
| 8,234,904 | B2 | 8/2012 | Kerner et al. | |
| 2002/0033039 | A1 | 3/2002 | Gautheret et al. | |

FOREIGN PATENT DOCUMENTS

| | | | |
|---|---|---|---|
| EP | 2006962 | A1 | 12/2008 |
| JP | 2007153525 | A * | 6/2007 |

* cited by examiner

MAGAZINE FOR PROCESSING WIRE END FERRULES

BACKGROUND OF THE INVENTION

Field of the Invention

The invention relates to a magazine for processing wire terminations, which are connected to one another via connecting bridges to form a wire termination strip, with having at least one housing base and a feed opening for inserting the wire termination strip.

In addition, the invention relates to a hand tool for crimping wire terminations with a stripped conductor end, or with the stranded wires of a conductor, with a pliers-like handle, with at least two die stocks that can be brought together by actuating the handle and that form a depression, in which the wire termination can be positioned, and are stored with a magazine in the wire termination, wherein the wire terminations can be fed from the magazine to the depression.

Description of the Related Art

The crimping of wire terminations with a stripped conductor end or with the stranded wires of a conductor is also known as crimping in the state of the art. During crimping, two components are connected to one another by plastic deformation, so that a homogeneous, nearly undetachable connection exists between the conductor and the wire terminations. Crimping is applied as an alternative to soldering or welding in the production of electrical connections. Using a hand tool or a crimping tool, the strands of a cable are connected positively to a wire termination. In this case, relatively high forces are to be applied. In most cases, multiple wire terminations are to be crimped in succession with corresponding conductors. In this case, in order to proceed as expeditiously as possible, there are crimping tools with a supply magazine, in which wire terminations are stored. After a wire termination is crimped, the next wire termination can be inserted manually or automatically into the tool.

European Patent EP 2 182 595 A2 and corresponding U.S. Pat. No. 8,234,904 B2 show, for example, a removable magazine for a manually-operated crimping tool. The magazine has a cylindrical base element, in which numerous channels distributed over the periphery are made, into which in each case, individual housings that serve to accommodate individual electrical contacts are inserted. The electrical contacts are inserted into the magazine individually.

German Patent DE 42 41 224 C1 discloses a crimping tool with a cylindrical magazine for accommodating a wire termination strip. The magazine is in this case arranged at a distance from the actual crimping station, so that the beginning of the wire termination strip from the magazine is inserted via an opening into the housing of the crimping tool in the area of a transport system. The transport system has, as an essential component, a transport wheel, which has recesses that are distributed uniformly over its periphery and can rotate around an axis. The separation of an individual wire termination from the strip is done in this case during the actual crimping process. In this case, the connecting bridge between the foremost wire termination and the next wire termination is torn off by a movable die stock pressing the foremost wire termination radially outward, i.e., the normal radius of the recesses is exceeded, so that the foremost wire termination is moved radially outward.

In the case of the magazines and hand tools mentioned above, the handling is disadvantageous. It is occasionally cumbersome to insert the individual wire terminations into the magazine. When feeding stranded wires into wire terminations that are connected to one another, it may occur that stranded wires are bent and are not plugged into the wire terminations, since the immobility of the hand tool hinders the insertion of the conductor. As a result, bad crimping connections can occur that occasionally lead to damage in devices in which the conductor is incorporated with the wire terminations.

SUMMARY OF THE INVENTION

The object of this invention is therefore to indicate a magazine for processing wire terminations as well as a hand tool with a corresponding magazine, which ensure an easier handling and an improvement in process safety.

According to a first teaching, the invention relates to a magazine in which the object is achieved in that a transport wheel that is mounted to rotate around an axis of rotation is arranged in the housing, in that the transport wheel has multiple recesses for accommodating individual wire terminations of a wire termination strip, wherein two recesses that are arranged adjacent to one another in each case are separated from one another by one edge, in that the wire terminations of the wire termination strip can be brought in succession into an assembly position by a rotation of the transport wheel, in which assembly position the connecting bridge between two adjacent wire terminations is at least partially severed by the edge of the corresponding recess. The recesses of the transport wheel are distributed over the periphery of the transport wheel, so that the recesses are shaped like shovels, and the transport wheel is accordingly configured as an impeller. The recesses are arranged in the peripheral direction at uniform intervals. The wire terminations can be arranged respectively in the recesses. The connecting bridges to which the wire terminations are connected are arranged directly on the edges of the recesses. The edges of the recesses or the edges of the transport wheel serve simultaneously as cutting knives, which together with a housing wall or a component that is attached in the housing are moved toward one another during the cutting process. In this way, the transport wheel can be rotated, for example, in the housing, until one of the edges approaches the component or the housing wall at a desired point in the housing.

Another rotation of the transport wheel causes the edge of the recess and thus also the connecting bridge located on the edge on the inside wall of the housing or the component to approach, in such a way that the distance between the edge and the housing wall is at a minimum. Another rotation ensures that the flexible connecting bridge is pressed together and ultimately severed, so that a wire termination is separated from the wire terminations that are connected to a strip.

Preferably, the separation of the wire termination is performed near the assembly position of the wire terminations. In this way, the process safety is increased, since the wire terminations remain connected to a strip until the time of assembly or the insertion of a conductor into the wire terminations, and no individual wire terminations can be falsely positioned in the magazine.

For a simplified further processing of the separated wire terminations, it is provided in the case of an advantageous configuration of the invention that the housing has at least one housing base, that an opening is made in the housing base, wherein a wire termination that is located in the assembly position is arranged in immediate proximity to the opening. After the separation and the processing of a wire termination, the wire termination can be removed from the magazine via the opening. The opening can be configured funnel-shaped. By further rotation of the transport wheel, the next wire termination is separated from the wire termination strip and can be processed. In this case, the rotation can be done manually or automatically with a suitable gear system and drive.

The housing of the magazine can have any geometry. Preferably, the housing is configured to be cylindrical. It can also have another rotationally-symmetrical shape, however. It is also possible for the housing to be configured like a spiral or spiral-shaped.

In order to achieve a more specific separation of the individual wire terminations, it is provided in the case of an advantageous configuration of the invention that the transport wheel is surrounded by a housing wall, which has at least one spiral section, in which the distance between the edges of the recesses and the housing wall in the direction toward the opening decreases in the radial direction. The distance between the edges of the recess and the housing wall thus steadily decreases in the peripheral direction of the transport wheel toward the opening. In this way, with progressive rotation of the impeller, a respective edge of the impeller approaches the housing wall until the distance is at a minimum. In the case of inserted wire terminations, the connecting bridge is still located between two wire terminations on the edge of the recess, which separates the two adjacent recesses from one another. By bringing the edge closer to the housing wall, the connecting bridge is pressed against the edge of the recess of the transport wheel. Since the distance in the case of a further rotation of the transport wheel steadily decreases because of the spiral configuration of the section of the housing wall, the connecting bridge is severed when the distance between the edge of the recess and the housing wall is at a minimum. The severing of the connecting bridge is done in this case in the radial direction, starting from the center of the transport wheel.

In order to further improve the handling of the magazine, in particular relative to the at least partial severing of the connecting bridge, in the case of an advantageous configuration of the magazine according to the invention, it is provided that the housing has an upper wall of the housing that is arranged above the transport wheel, which upper wall together with the housing wall and the transport wheel forms a guide channel for the wire termination strips, and that the upper wall of the housing has an incline, so that the height of the guide channel decreases in the direction toward the opening. The distance between the recesses and the upper wall of the housing thus steadily decreases in the peripheral direction of the transport wheel in the direction toward the opening. In this way, with progressive rotation of the transport wheel, the wire terminations starting from the feed opening are driven deeper into the recesses, since the distance to the upper wall of the housing decreases further and further.

In this case, the recesses can be configured so that they accommodate the wire terminations positively without play and are configured as a whole to be deeper than the longitudinal extension of the wire terminations, so that the latter can be brought further into the recesses with little resistance. When, in the case of the rotation of the transport wheel, the distance between the edges of the recesses and the housing wall or a component that is applied in the housing is reduced at the same time, the connecting bridge between the wire terminations is not uniformly severed in the radial direction, i.e., simultaneously at any point. Rather, the connecting bridge, because of the simultaneous axial movement of the wire terminations, is at least partially severed axially. With partial severing, the wire terminations are moved along a curvilinear path and are also shifted at least at times by the incline of the upper wall of the housing in the direction of the axis of rotation. In this way, the connecting bridges are severed axially, i.e., steadily along the longitudinal extension of the wire terminations.

For the simple introduction of a conductor or the stranded wires of a conductor into the wire termination, in the case of a configuration of the invention, a funnel-shaped conductor feed opening is made in the upper wall of the housing. The conductor feed opening and the opening in the housing base lie in a line, so that they have a common longitudinal axis. The longitudinal axis preferably runs parallel to the axis of rotation of the transport wheel. It is also conceivable, however, that the common longitudinal axis of the conductor feed opening and the opening runs obliquely relative to the axis of rotation of the transport wheel or is arranged at an angle to the axis of rotation that is not equal to 0 degree. In this way, it is possible to insert a conductor obliquely to the housing. Preferably, a conductor or the stranded wires of a conductor can also be inserted into the conductor feed opening, parallel to the axis of rotation of the transport wheel. When the wire termination is located in the assembly position, it is located between the conductor feed opening and the opening. The wire termination is arranged in the assembly position in its longitudinal extension on the common longitudinal axis of the conductor feed opening and the opening. In the feed direction, the conductor feed opening initially has a larger cross-section that further decreases in the feed direction, so that an inserted conductor is positioned automatically. In this case, the conductor is inserted through the conductor feed opening into the wire termination, which is located in the assembly position. To improve the positioning, the funnel-shaped recess can be encircled by two funnel halves. The funnel halves are adjacent to one another when the stranded wires are inserted and thus ensure precise guiding of the conductor's stranded wires. When the conductor is inserted, the funnel halves are forced apart by the wire insulation and ultimately by the wire terminations, so that they are far enough apart to remove the wire termination. The opening through which the wire termination can be guided at least partially from the housing can also be encircled in the shape of a funnel and/or by two separate funnel halves, so that the wire termination is positioned accordingly. By means of a correspondingly selected diameter of the opening, the insulating collar of the wire termination remains in the magazine, since the latter has a larger diameter than the opening. It is also conceivable that a stop is formed at the opening; said stop keeps the wire termination from being removed completely from the housing, so that only a part of the wire termination is guided to be severed from the housing, and the insulating collar of the wire termination remains in the magazine.

For an improved positioning of the wire termination inside the housing, it is provided in the case of a preferred configuration of the magazine according to the invention that the distance between the housing wall and the opposite edge of the recess, which is arranged in the area of the opening, is proportioned so that the connecting bridge is more than 60% severed, in particular more than 80% severed. In the assembly position, and before a conductor is inserted, the connecting bridge is thus not completely severed. After the insertion of a conductor into the wire termination, which is located in the assembly position, the connecting bridge between the wire termination in the assembly position and the other wire terminations is completely separated. In the case of an axial section, a part of the connecting bridge in the axial direction is not severed. The insertion of the conductor, preferably parallel to the axis of rotation of the transport wheel, provides for a complete severing of the connecting bridge. When the conductor is inserted, the connecting bridge is already weakened to the extent that the insertion is sufficient to tear the wire termination off from the rest of the wire termination strip. This applies analogously for a radial section, or the radial severing of the connecting bridge. The connecting bridge is pressed in the assembly position of the wire termination against the edge of the recess and is already weakened to the extent that the insertion of the conductor is sufficient to separate the wire termination completely from the strip. It is conceivable in this case that the wire termination is pressed still further into the recess when the conductor is inserted through the conductor feed opening, so that a complete separation of the wire termination from the rest of the strip is possible.

The opening is located with the conductor feed opening in a line. In this way, a conductor can be inserted through the conductor feed opening into a wire termination in the assembly position. If the conductor is moved further into the conductor feed opening, the wire termination is detached from the rest of the wire termination strip, and the wire termination is at least partially conveyed from the housing together with the conductor through the opening for another processing. Because of the funnel-shaped conductor feed opening, the conductor is ideally oriented with respect to the wire termination. The opening below the wire termination allows for an ideal positioning of the wire termination with an inserted conductor for a further processing.

The accuracy of the positioning of the wire termination can be further improved in another configuration of the magazine according to the invention. To this end, it is provided that a positioning system is arranged between the transport wheel and the housing, which system produces a step-by-step rotation of the transport wheel. The positioning system gives the user a feel for whether the transport wheel is positioned in such a way that at least one wire termination is located in the assembly position. The positioning system can give haptic feedback so that when the transport wheel rotates, the user is notified that the assembly position is reached. Visual or acoustic signals of the positioning system would also be conceivable. A preferred option for determining position is a latching mechanism, so that the transport wheel is locked in the assembly position. In this way, the transport wheel is stopped initially in the assembly position, and the wire termination is ideally oriented with respect to the conductor feed opening and thus also to a correspondingly inserted conductor.

In a preferred configuration of the magazine according to the invention, it is therefore provided that the positioning system is implemented as a spring-loaded round-headed catch. The round-headed catch is distinguished in that a sphere or hemisphere that is supplied with a spring force or a similar spherical object serves as a latching catch. The elastic latching catch engages in corresponding latching recesses in the transport wheel. On the transport wheel, a latching recess can be provided in the area of each recess, since each recess can be brought into the assembly position of the wire terminations because of the rotation of the transport wheel. Because of the rounded latching catch, the round-headed catch is easy to detach without the latching mechanism and the corresponding components experiencing heavy wear-and-tear. Nevertheless, the latching function is strong enough that haptic feedback that the assembly position was reached is conveyed to the user.

In order to further simplify the handling of the magazine according to the invention, it is provided in a configuration of the invention that the housing is configured to be at least partially transparent, so that it can be seen from outside how many wire terminations are arranged in the housing. In this case, the housing can be configured to be transparent in particular in the area of the upper wall of the housing, which is arranged parallel to the transport wheel, so that the view of the entire transport wheel and the recesses is possible. Thus, the user can easily see how many wire terminations are still located in the housing. Transparency of the housing in the area of the lateral walls or the shell of, for example, a cylindrical housing would also be conceivable, so that a view of the peripheral side of the transport wheel is possible. Accordingly, it is also possible to detect the wire terminations in the recesses in order to insert additional wire termination strips through the feed opening in the magazine at the proper time before use.

The rotation of the transport wheel can be simplified by ensuring that in one configuration of the magazine according to the invention, a feed element is provided that is connected to the transport wheel in such a way that a rotation of the feed element produces a rotation of the transport wheel. The feed element can be arranged outside of the housing, so that it is easily accessible to the user. The feed element can have, for example, a wheel shape. The feed element can, similar to the transport wheel, be provided with recesses that are equally spaced. In this way, the feed element is, on the one hand, more slip-proof, so that rotation can be done more easily; on the other hand, the user can orient himself on the recesses and gauge, for example, how far the feed element has to be rotated so that the next assembly position is reached. For easier operation, the feed element can project beyond the housing, so that it is easy to reach with the fingers. The feed element does not have to be configured in the shape of a wheel. It can have any shape. The feed element is preferably arranged parallel to the transport wheel on the same axis of rotation, so that direct transfer to the transport wheel can be achieved. It is also conceivable, however, that the feed element is arranged perpendicular or parallel offset to the axis of rotation and is connected to the transport wheel via a gear system.

According to a second teaching, the invention relates to a hand tool for crimping wire terminations with a stripped conductor end or with the stranded wires of a conductor with a magazine for wire terminations, in which the previously-derived object is achieved. The hand tool according to the invention is initially and essentially characterized in that the magazine is configured according to the invention.

The embodiments relative to the magazine according to the invention accordingly also apply for the hand tool according to the invention with an attached magazine.

With the hand tool, it is possible to connect the wire termination positively to the conductor or to the stranded wires of a conductor. In this case, a joining process, crimping, is used. The wire termination is inserted with the inserted conductor into the depression and pressed together via the die stocks in such a way that the wire termination and the part of the conductor that is located in the wire termination undergo a plastic deformation. In order to increase the force that can be applied by the user, the hand tool can have an elbow lever, since during motion, the speed ratio continuously shifts between the applied force to the resulting force or from the primary stroke to the secondary stroke, and thus initially higher speeds of the die stocks can be achieved at lower force, and in the critical area, a low speed can be achieved with high force.

Because of the magazine that is connected to the hand tool, wire terminations into which a conductor is already plugged in the above-mentioned advantageous way can be fed to the depression of the hand tool. The wire termination can then be positioned directly in the depression of the hand tool via the opening in the housing base of the magazine. In this case, the opening of the magazine is arranged directly over the depression of the hand tool. A wire termination that can be located in the assembly position can thus receive a conductor through the conductor feed opening. If the conductor is further inserted into the wire termination, the latter is detached from the wire termination strip and is further introduced through the opening directly into the depression of the hand tool. The wire termination is thus, just like an inserted conductor, introduced into the depression of the hand tool preferably parallel to the axis of rotation of the transport wheel.

Bypass means are provided for easy operability. The bypass means interact with the pliers-like handle and the die stocks in such a way that by manually operating the handle, the crimping of at least one wire termination with a stripped conductor can be performed. In this way, the user can crimp the wire terminations with a conductor at lowest possible expense by only the handle being operated manually.

In an advantageous configuration of the hand tool according to the invention, it is provided that the magazine is detachably connected to the hand tool, in particular by a latching connection. The mounting of the magazine on the hand tool can be done by, for example, a rotational movement, similar to a bayonet closure, or by plugging. The precise positioning of the magazine is done in this case via pins or other projections that are made on the magazine and engage in corresponding recesses. The pins or projections can also be made on the frame of the hand tool and the corresponding recesses on the magazine accordingly. Thus, a limited tolerance can be achieved between the funnel-shaped opening on the housing base of the magazine and the middle of the depressions. The snapping-on can also be done, for example, by means of bent holding elements that engage behind the hand tool on the opposite side from where the magazine is attached. Because of the positioning of the magazine, the magazine thus does not slip, although it is a simple matter to fasten the magazine to the hand tool.

In order to enhance the quality of the crimping of the wire termination, in the case of an advantageous configuration of the hand tool according to the invention, more than two die stocks are provided, so that symmetrical crimping is done between the wire termination and the stripped conductor end or with the stranded wires of the conductor. The die stocks are then moved toward one another not only from two sides but are also moved toward one another from multiple directions in such a way that a symmetrical cross-section is produced between the die stocks, i.e., a symmetrical depression is produced. One advantage of using more than two die stocks consists in that the geometry of the depression remains the same or very similar for a large cross-sectional area. The die stocks close like a diaphragm, by which the geometry of the cross-section of the depression does not noticeably change during closing, since the die stocks are moved toward one another uniformly.

For that reason, in the case of an advantageous configuration of the invention, it is provided that the die stocks are arranged in such a way that square crimping is done. In the case of an alternative configuration of the invention, it is provided that the die stocks are arranged in such a way that hexagonal crimping is done.

In particular, there are a number of options that configure and further develop the magazine according to the invention as well as the hand tool according to the invention. To this end, reference is made to the subsequent description of a preferred embodiment in connection with the drawings.

DETAILED DESCRIPTION OF THE INVENTION

Figure 1:
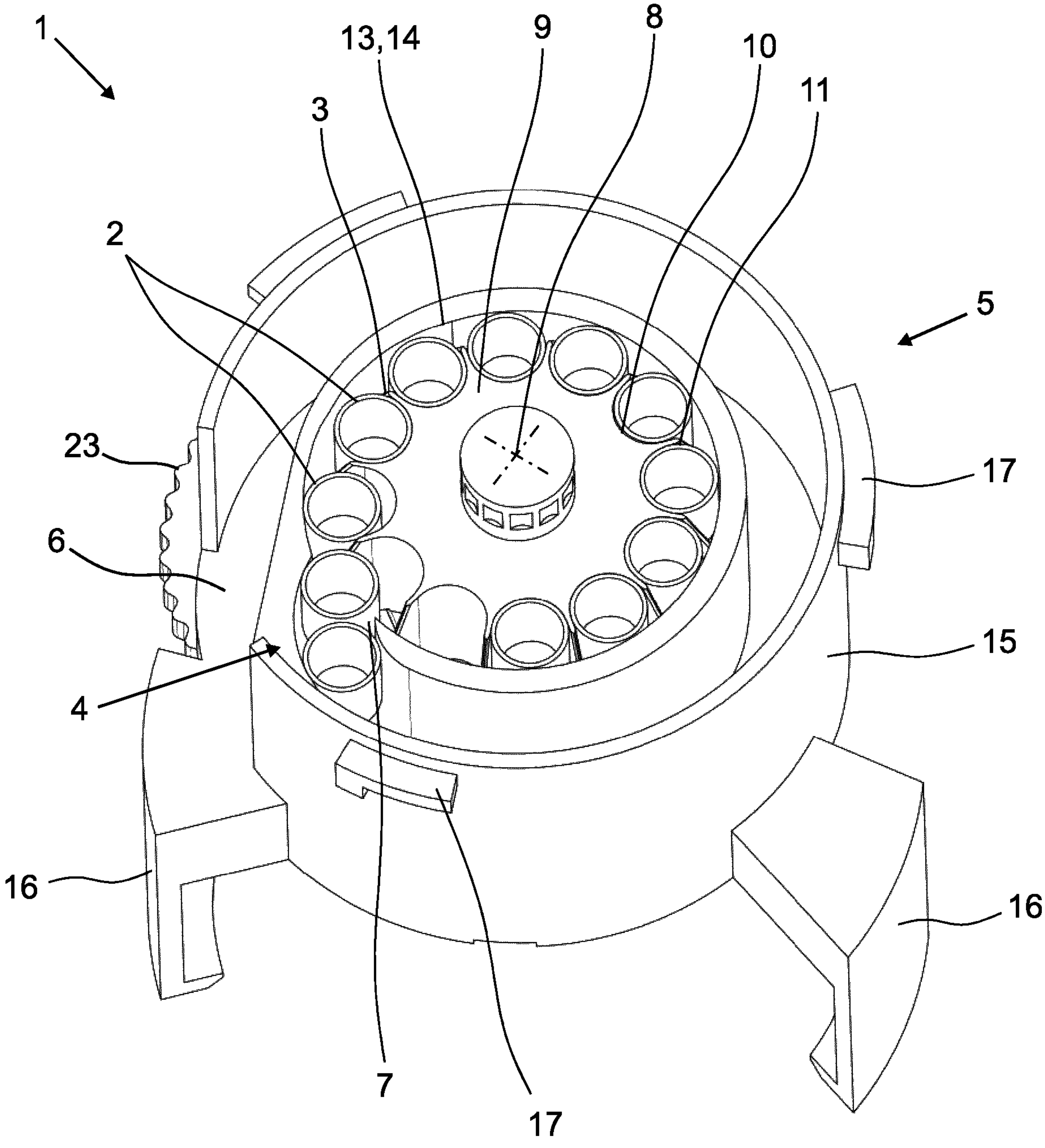
FIG. 1 is a perspective view of part of a magazine for processing wire terminations

FIG. 1 shows a magazine 1 for processing wire terminations 2 that are arranged in the magazine 1, which wire terminations are connected to one another via connecting bridges 3 to form a wire termination strip 4. The magazine 1 comprises a cylindrical housing 5 with a housing base 6 and a feed opening 7 for the wire termination strip 4. A transport wheel 9 that is mounted to rotate around an axis of rotation 8 is arranged in the housing 5. The wire terminations 2 are separated in the magazine 1.

The separation is performed as follows: The transport wheel 9 has recesses 10, in which the wire terminations 2 are arranged. The connecting bridges 3 of the wire termination strip 4, in this case, lie on the edges 11 of the recesses 10. The transport wheel 9 is configured like an impeller, so that when the transport wheel 9 is turned, the wire terminations 2 are guided into the circuit, wherein a wire termination 2 can be brought into an assembly position, in which it is arranged in the housing base via an opening 12. A housing wall 13 of the housing 5 encloses the transport wheel 9 on the peripheral side. The housing wall 13 has a spiral section 14. This means that the distance between the edges 11 of the recesses 10 and the housing wall 13 starting from the feed opening 7 in the peripheral direction of the transport wheel 9 decreases in the direction toward the opening 12. This means that the connecting bridges 3 of the wire termination strip 4 are pressed against the respective edge 11 of the recess 10. The further the transport wheel 9 is rotated, the smaller the distance between the edge 11 and the housing wall 13, so that starting from a certain point, the connecting bridge 3 can no longer withstand the pressure, and the corresponding wire termination 2 is separated from the wire termination strip 4.

FIG. 1 shows that an outer wall 15 of the housing is arranged around the housing wall 13, through which outer wall the feed opening 7 is enlarged by one peripheral length. In this way, longer wire termination strips 4 can also be introduced into the magazine 1, even when not all wire terminations 2 are arranged in the recesses 10 of the transport wheel 9 at the same time. It is also conceivable that multiple shorter wire termination strips 4 are arranged in the extended feed opening 7. The latter must then be moved manually, however, by further insertion into the engagement of the transport wheel 9.

In addition, fastening elements 16, with which the magazine 1 can be fastened to a hand tool (depicted in FIGS. 8-11), are arranged on the housing 5. A housing cover, not shown, can be fastened to the housing 5 by means of closing elements 17. The closing elements 17 or the closure together with the cover work according to the principle of a bayonet closure. The cover is rotated relative to the housing 5. Latching hooks corresponding to the closing elements 17 are made on the cover, which hooks engage in the closing elements 17, so that the cover can no longer be raised.

Figure 2:
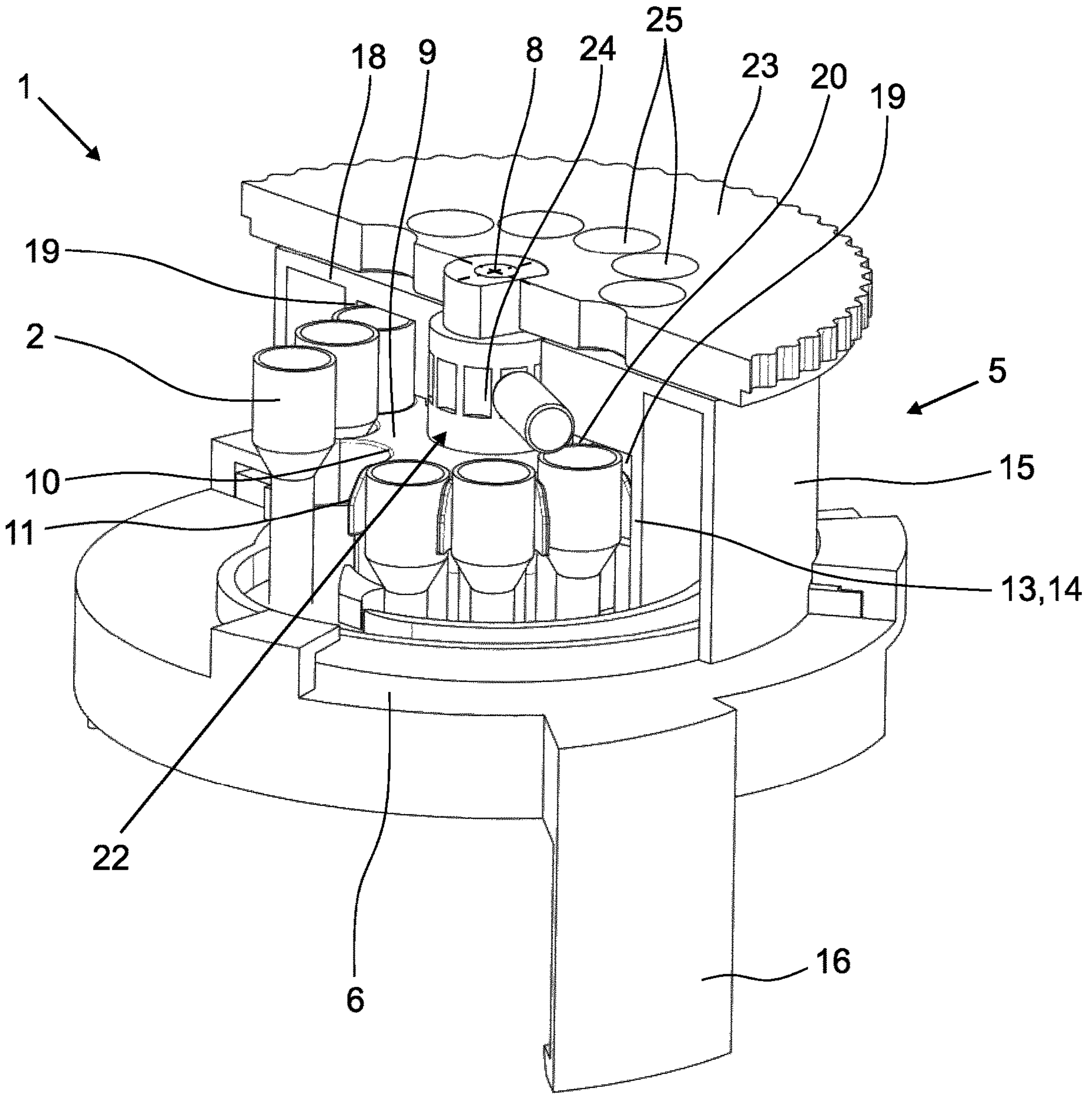
FIG. 2 shows a part of another embodiment of the magazine with a feed element.

FIG. 2 shows a part of another embodiment of a magazine 1, in which an upper wall 18 of the housing is depicted. The upper wall 18 of the housing, together with the transport wheel 9 and the housing wall 13, bounds a guide channel 19, into which the wire terminations 2 are fed. The guide channel 19 has an incline 20 on the upper wall 18 of the housing. This means that the distance between the transport wheel 9 and the upper wall 18 of the housing in the direction toward the opening 12 decreases in the peripheral direction. For practical use of the magazine 1, this means that, with one turn of the transport wheel 9 starting from the feed opening 7 through the incline 20, the wire terminations 2 are pressed steadily deeper into the recesses 10. At the same time, the edges 11 of the recesses 10 are guided closer to the housing wall 13 by the spiral section 14 of the housing wall 13. The connecting bridges 3 of the wire termination strip 4 are thus not only radially severed, but rather severed from bottom to top, i.e., axially and parallel to the axis of rotation 8 of the transport wheel 9.

The connecting bridges 3 of the wire termination strips 4 are, in this case, preferably not completely severed. A small remnant of the connecting bridges 3 remains when the wire termination 2 is located in the assembly position. In this way, the wire termination 2 cannot be moved accidentally into the housing 5. Even when a conductor, not shown, with its stripped end is fed through a conductor feed opening 21 into the wire termination 2 in the assembly position, the force that is exerted when fed to the wire termination 2 is sufficient to sever the connection completely.

The assembly position can be determined easily using a positioning system 22. In this case, this is a spring-loaded round-headed catch inside the housing 5. When the transport wheel 9 is brought into rotation by a user from outside via a feed element 23 in the form of a feed wheel, latching recesses 24, which are made in the shaft of the transport wheel 9, are moved via a sphere that is loaded with a spring force. In this case, the sphere works as a latching catch at the corresponding latching recesses 24, so that each time the sphere is pressed into a latching recess 24 by the spring force, the user is alerted via the easily-detachable latching connection to the fact that the assembly position of another wire termination 2 has been reached.

Figure 3:
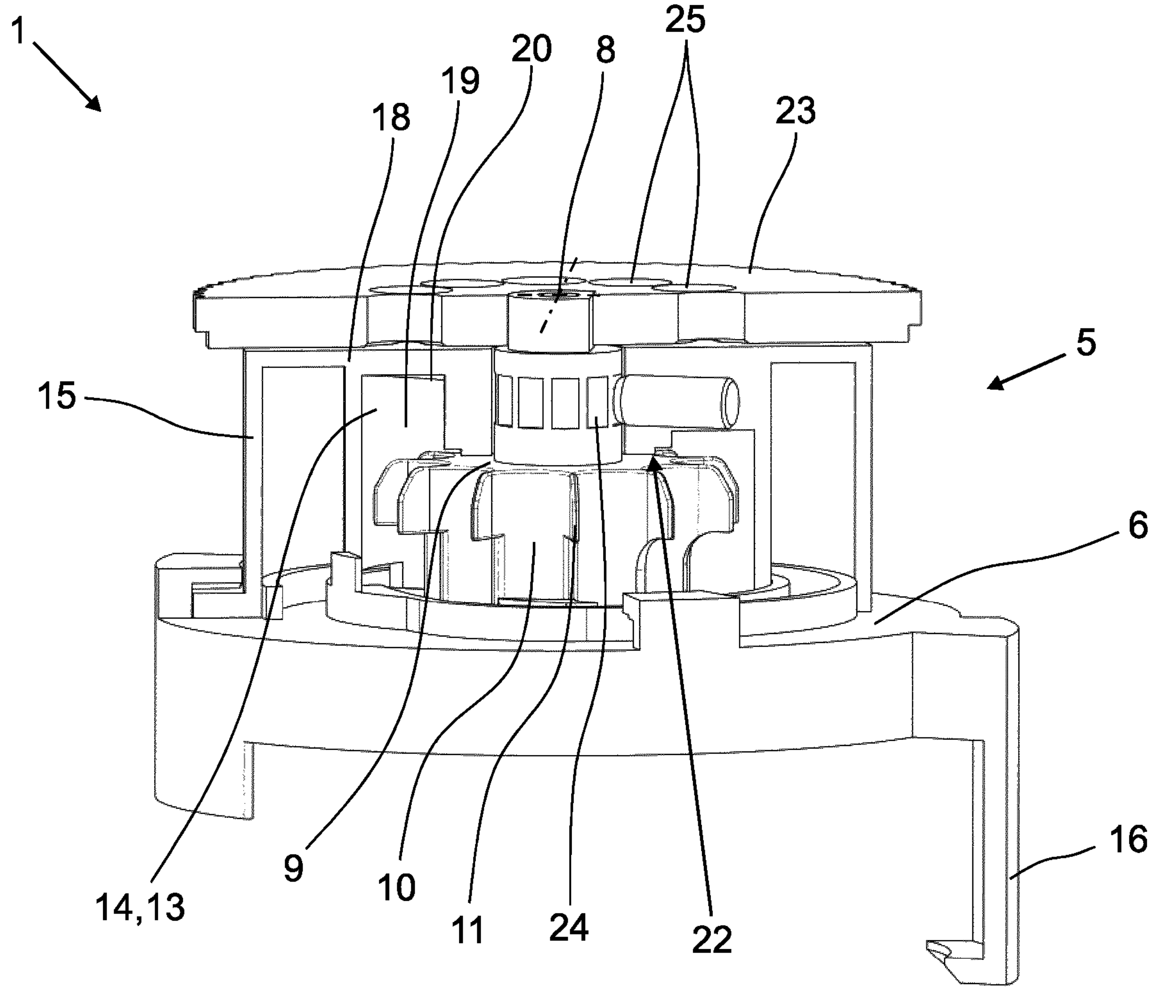
FIG. 3 is a side view of a part of the magazine according to FIG. 2.

FIG. 3 shows the embodiment according to FIG. 2 in a side view without wire terminations 2. As a result, the guide channel 19, which declines in height over the periphery because of the incline 20, is clearly depicted. The wire terminations 2 are pressed further and further into the recesses 10 because of the continuous incline 20, and at the same time, the recesses 10 are axially partially separated from one another by the edges 11.

Figure 4:
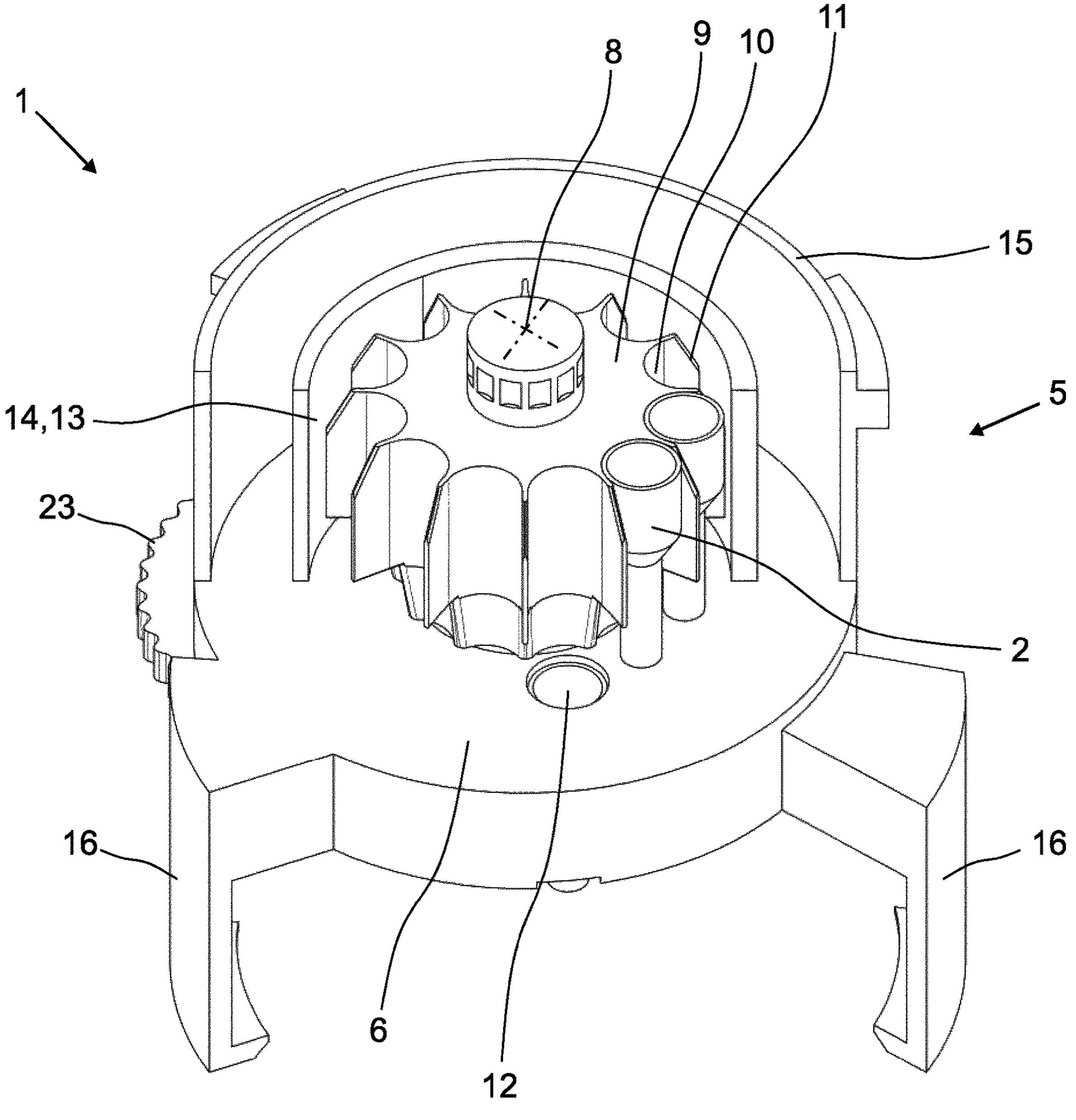
FIG. 4 shows a part of a magazine according to FIG. 1 from above at an angle.

FIG. 4 shows a part of a magazine 1, again without wire terminations 2. The opening 12 in the housing base 6 can be seen. The opening 12 is located below the assembly position of a wire termination 2. If a wire termination 2 is arranged in the assembly position, a conductor can be plugged with its stripped end into the wire termination 2 through the conductor feed opening 21. By pressing the conductor further down, the connection between the wire termination 2 and the wire termination strip 4 is completely severed. Together with the conductor, the wire termination 2 can then be guided through the opening 12 and then further processed. After the processing, the crimped wire termination 2 together with the conductor can be removed from the magazine 1, and the transport wheel 9 can be rotated until the assembly position of the next wire termination 2 is reached.

Figure 5:
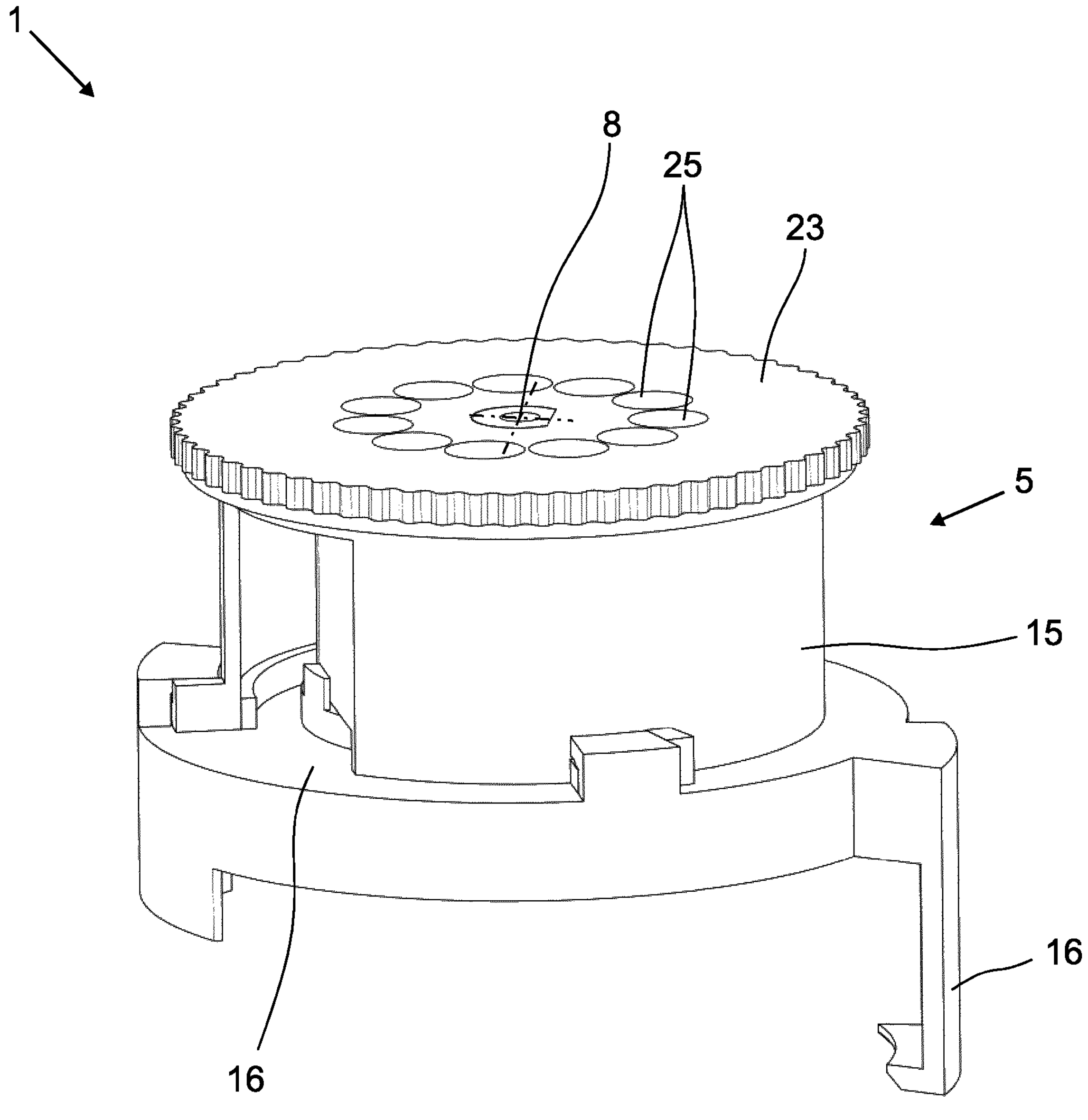
FIG. 5 shows a magazine for processing wire terminations with a housing and a feed element.

FIG. 5 shows a magazine 1 with a feed element 23 in the form of a feed wheel, which is arranged above the housing 5. For better handling, the feed element 23 is configured as a gear over the periphery. As a result, it is more slip-proof for a user and simplifies the rotation. Moreover, it projects laterally beyond the housing cover, in order to make it easier for the user's fingers to reach. The feed element 23 has multiple circular recesses 25, since it can rotate together with the transport wheel 9 and thus relative to the housing 5. The circular recesses 25 are thus positioned above the wire terminations 2, so that with each rotation of the transport wheel 7 into the assembly position of a wire termination 2, a circular recess 25 is arranged above the conductor feed opening 21 in order to make it possible for a conductor to be fed into the wire termination 2 in the assembly position.

Figure 6:
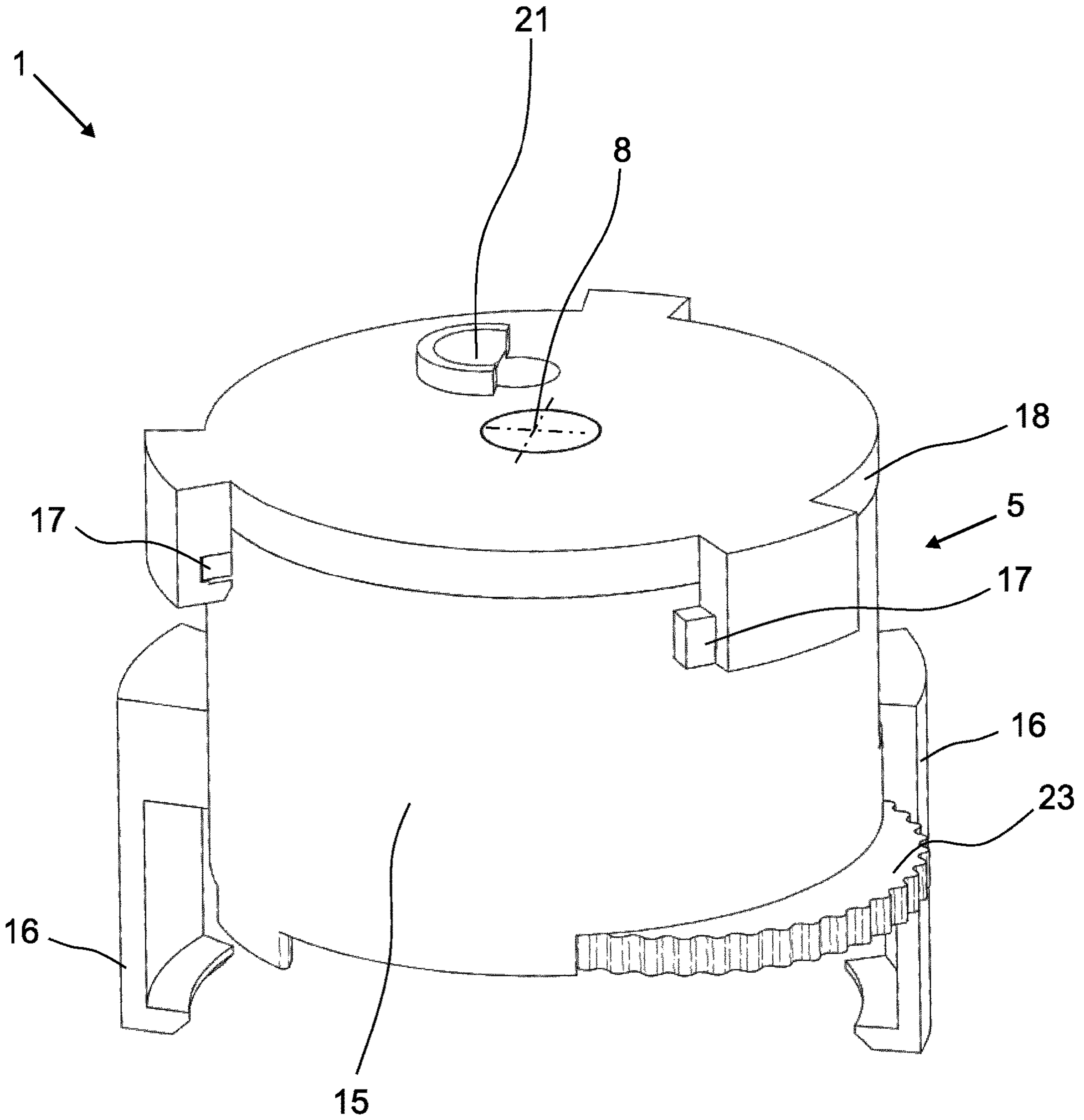
FIG. 6 shows a magazine for processing wire terminations with a housing.

FIG. 6 shows a magazine 1 with the upper wall 18 of the housing in which a conductor feed opening 21 is made. The feed element 23 is arranged on the housing base 6 and can be reached only from one side of the housing 5. The feed element 23 is not centered on the axis of rotation 8 of the transport wheel 9, but rather is arranged offset in this respect.

Figure 7:
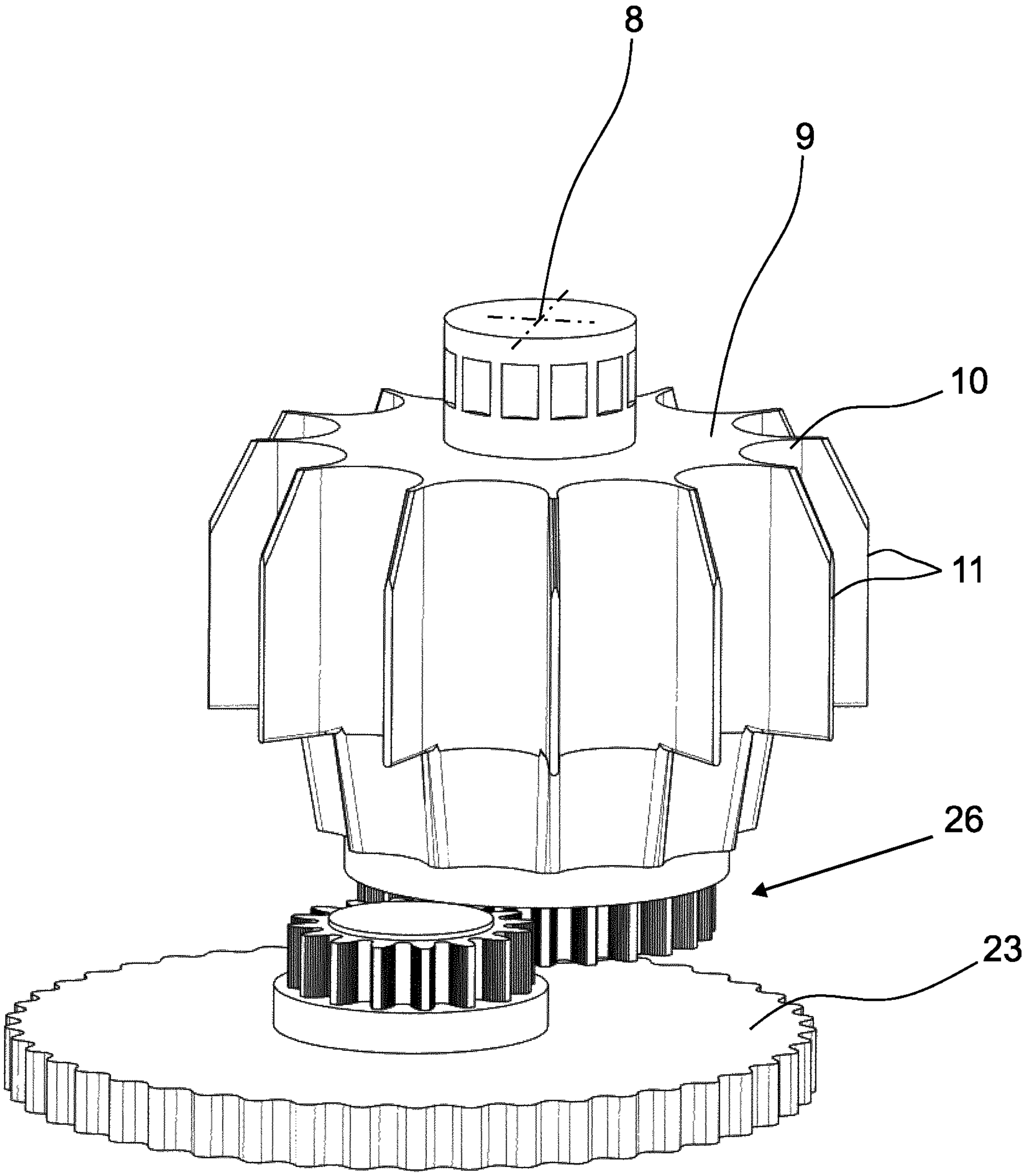
FIG. 7 shows the transport wheel of the magazine with a feed element.

FIG. 7 shows the arrangement of the feed element 23 according to FIG. 6, together with the transport wheel. The feed element 23 is connected via a gear system 26 to the transport wheel 9, so that the feed element 23 can be arranged offset to the transport wheel 9. Because of the configuration of the gear system 26, a rotation of the feed element 23 results in a reverse rotation of the transport wheel 9, which can be advantageous for operation depending on the arrangement of the magazine 1 on a hand tool. Other types of gear systems for a reverse rotation of the transport wheel 9 in the case of a rotation of the feed element 23 are also easily conceivable, however, for corresponding applications.

Figure 8:
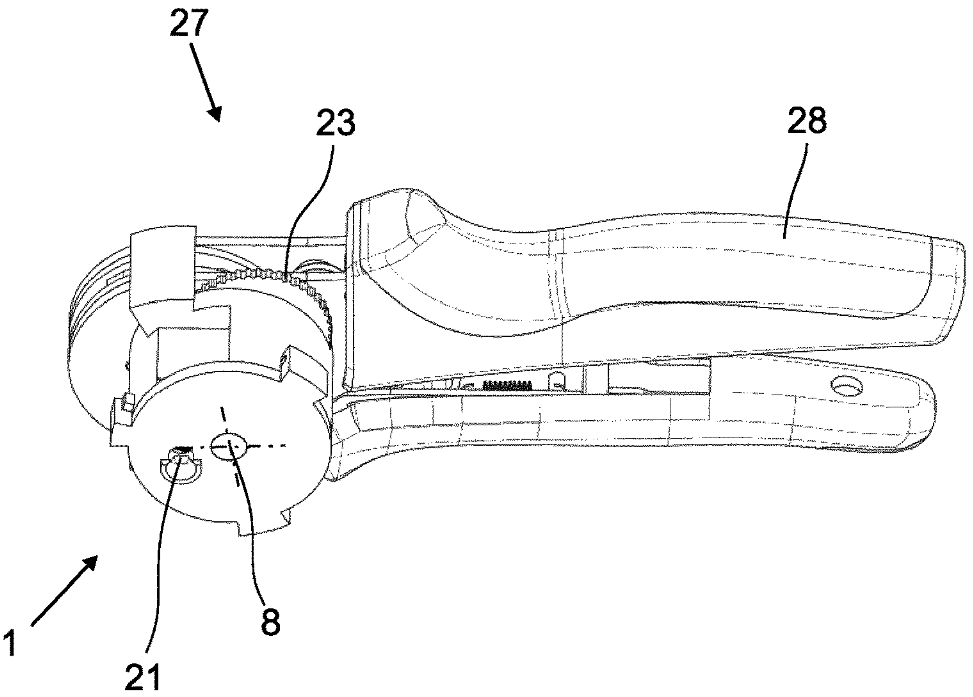
FIG. 8 is a perspective view of a hand tool for crimping wire terminations with a magazine.
Figure 9:
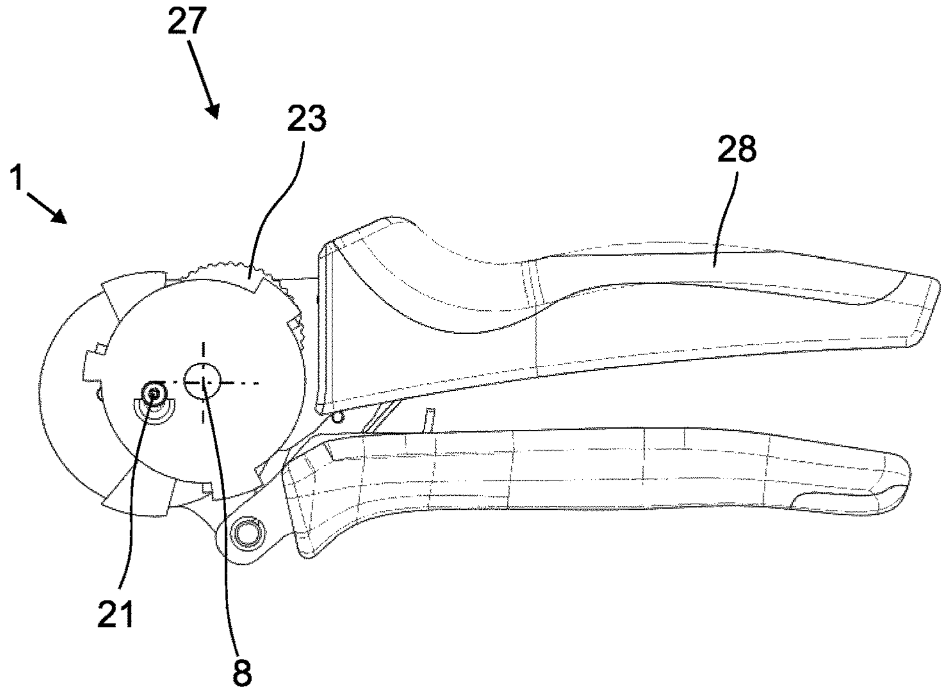
FIG. 9 is a side view of the hand tool according to FIG. 8.

FIGS. 8 and 9 show a hand tool 27 for crimping wire terminations 2 or more precisely for crimping wire terminations 2 with stripped conductor ends or with the stranded wires of a conductor in various views. The hand tool 27 has a pliers-like handle 28, which is designed to move multiple die stocks toward one another, not shown. The die stocks form a depression, into which the wire termination 2 is inserted and can be crimped. A magazine 1 for processing wire terminations 2 is fastened to the hand tool 27. In this case, the magazine 1 is arranged so that the opening 12 of the magazine is positioned so that running a wire termination 2 with a plugged-in conductor through the opening 12 from, at least partially, the magazine 1 causes the wire termination 2 to be automatically inserted into the depression. The opening 12 is thus arranged directly above the depression. The wire terminations 2 are introduced into the magazine 1 in continuous wire termination strips 4 and separated inside the magazine 1. Through the conductor feed opening 21, a conductor can be plugged into a wire termination 2, which is located in the assembly position. If the conductor is inserted further into the conductor feed opening 21, the conductor together with the wire termination 2 is routed through the opening 12 of the magazine 1 directly into the depression of the hand tool 27 and ideally positioned. Using the hand tool 27, a crimping connection can then be produced between the conductor end and a wire termination 2. According to the crimping method, the conductor together with the wire termination 2 are extracted from the magazine 1. The feed element 23 can then be further rotated, so that another wire termination 2 is brought into the assembly position, and the next crimping process can be started.

Figure 10:
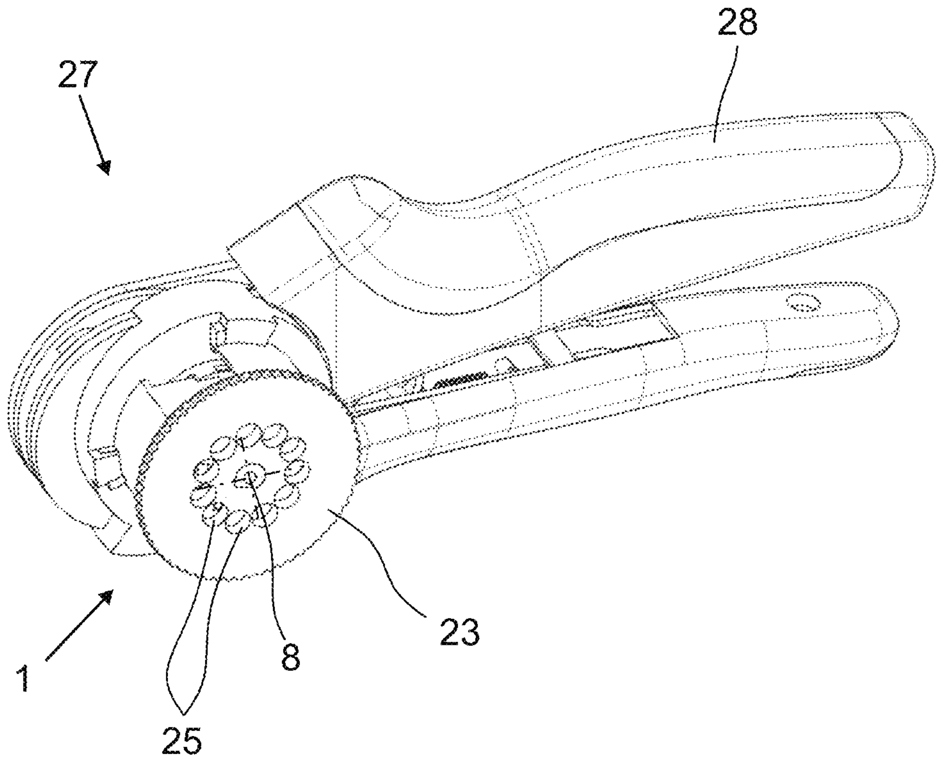
FIG. 10 is a perspective view of a hand tool for crimping wire terminations with a magazine.
Figure 11:
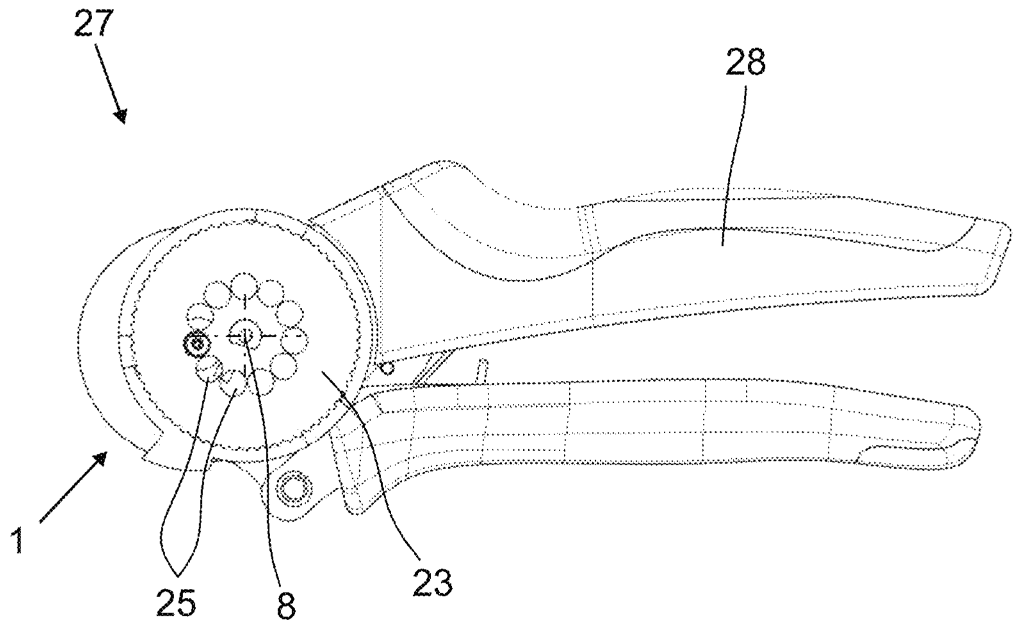
FIG. 11 is a side view of the hand tool according to FIG. 10.

FIGS. 10 and 11 show a hand tool 27 with a handle 28 in two different views. A magazine 1 for processing wire terminations 2 according to FIG. 5 is arranged on the hand tool 27. The magazine 1 has a feed element 23, which can rotate in the same axis of rotation 8 as the transport wheel 9 inside the magazine 1. The feed element 23 is arranged outside on the housing 5 of the magazine 1, so that a user can easily reach it. Because of the position of the feed element 23, the feed element 23 has multiple circular recesses 25. At least one of the circular recesses 25 is located specifically inside the magazine 1 above an assembly position of the wire terminations 2. Since the feed element 23 can rotate relative to the housing 5, but at the same time rotates with the transport wheel 9 inside the housing 5, the circular recesses 25 always remain above the same recess 10 of the transport wheel 9. The function of the hand tool 27 is otherwise analogous to the hand tool 27 that is described in FIG. 8 and FIG. 9.

The invention claimed is:

1. A magazine for processing wire terminations, which are connected to one another via connecting bridges to form a wire termination strip, comprising:

- a housing having a feed opening for inserting the wire termination strip, and
- a transport wheel that is mounted in the housing to rotate around an axis of rotation,
- wherein the transport wheel has multiple recesses for accommodating individual wire terminations of the wire termination strip, the recesses that are arranged adjacent to one another being separated from one another by an edge,
- wherein the wire terminations of the wire termination strip are movable in succession by a rotation of the transport wheel into an assembly position in which the connecting bridge between two adjacent wire terminations is at least partially severed by the edge of the corresponding recess,
- wherein the edges of the recesses arranged adjacent to one another are in a shape of cutting knives for the at least partially severing of the connecting bridge.

2. The magazine according to claim 1, wherein the housing has at least one housing base, wherein a routing opening is made in the housing base, and wherein a wire termination that is located in the assembly position is arranged in immediate proximity to the routing opening.

3. The magazine according to claim 2, wherein the transport wheel is surrounded by a housing wall which has at least one spiral section in which a distance between the edges of the recesses arranged adjacent to one another and the housing wall decreases in a radial direction toward the routing opening.

4. The magazine according to claim 2, wherein the housing has an upper wall that is arranged above the transport wheel, wherein the upper wall, together with the housing base and the transport wheel, forms a guide channel for the wire termination strip, and wherein the upper wall of the housing inclines in a manner decreasing a height of the guide channel in a direction toward the routing opening.

5. The magazine according to claim 2, wherein a funnel-shaped conductor feed opening is provided in an upper wall of the housing, and wherein the conductor feed opening and the routing opening in the housing base lie in a line, so that they have a common longitudinal axis.

6. The magazine according to claim 5, wherein the distance between the housing wall and an opposite edge of the recess, which is arranged in the area of the routing opening, is proportioned so that the connecting bridge is more than 60% severed.

7. The magazine according to claim 1, wherein a positioning system is arranged between the transport wheel and the housing, the positioning system being configured for producing a step-by-step rotation of the transport wheel.

8. The magazine according to claim 7, wherein the housing is at least partially transparent in a manner enabling how many wire terminations are arranged in the housing to be externally determined.

9. The magazine according to claim 1, further comprising a feed element which is connected to the transport wheel in such a way that a rotation of the feed element produces rotation of the transport wheel.

10. A magazine for processing wire terminations, which are connected to one another via connecting bridges to form a wire termination strip, comprising:

- a housing having a feed opening for inserting the wire termination strip, and
- a transport wheel that is mounted in the housing to rotate around an axis of rotation,
- wherein the transport wheel has multiple recesses for accommodating individual wire terminations of the wire termination strip, the recesses that are arranged adjacent to one another being separated from one another by an edge,
- wherein the wire terminations of the wire termination strip are movable in succession by a rotation of the transport wheel into an assembly position in which the connecting bridge between two adjacent wire terminations is at least partially severed by the edge of the corresponding recess of the recesses arranged adjacent to one another, said edge being in a shape of a cutting knife, and
- wherein a positioning system comprises a spring-loaded round-headed catch.

* * * * *